(12) United States Patent
Ganesh et al.

(10) Patent No.: US 7,624,112 B2
(45) Date of Patent: Nov. 24, 2009

(54) ASYNCHRONOUSLY STORING TRANSACTION INFORMATION FROM MEMORY TO A PERSISTENT STORAGE

(75) Inventors: Amit Ganesh, San Jose, CA (US); Bipul Sinha, Foster City, CA (US); Lakshminarayanan Chidambaran, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 834 days.

(21) Appl. No.: 10/407,998

(22) Filed: Apr. 3, 2003

(65) Prior Publication Data

US 2004/0199924 A1 Oct. 7, 2004

(51) Int. Cl.
*G06F 17/00* (2006.01)
(52) U.S. Cl. .......................................... 707/10; 718/101
(58) Field of Classification Search ................. 707/201, 707/10; 709/237; 718/101; 705/64, 75; 714/E11.131
See application file for complete search history.

(56) References Cited

U.S. PATENT DOCUMENTS

| | | | | |
|---|---|---|---|---|
| 5,335,343 | A * | 8/1994 | Lampson et al. | 714/19 |
| 5,930,794 | A * | 7/1999 | Linenbach et al. | 707/100 |
| 6,021,408 | A * | 2/2000 | Ledain et al. | 707/8 |
| 6,490,610 | B1 * | 12/2002 | Rizvi et al. | 718/101 |
| 6,711,632 | B1 * | 3/2004 | Chow et al. | 710/29 |
| 6,925,515 | B2 * | 8/2005 | Burns et al. | 710/200 |
| 6,947,956 | B2 * | 9/2005 | Olstad et al. | 707/200 |
| 2002/0083331 | A1 * | 6/2002 | Krumel | 713/200 |
| 2002/0099973 | A1 * | 7/2002 | Moser et al. | 714/11 |
| 2003/0051047 | A1 * | 3/2003 | Horel et al. | 709/237 |
| 2003/0084074 | A1 * | 5/2003 | Balogh et al. | 707/201 |

OTHER PUBLICATIONS

Mao, Yun; Youhui Zhang; Dongsheng Wang; Weimin Zheng; "LND: A Reliable Multi-Tier Storage Device in NOW." ACM Press: ACM SIGOPS Operating Systems Review, vol. 36, Issue 1, Jan. 2002; pp. 70-80.*

Baker, Mary; Satoshi Asami; Etienne Deprit; John Ouseterhout; Margo Seltzer; "Non-Volatile Memory for Fast, Reliable File Systems." ACM Press: Proceedings of the fifth international conference on architectural support for programming languages and operating systems, 1992; pp. 10-22.*

(Continued)

*Primary Examiner*—Diem Ky Cao
(74) *Attorney, Agent, or Firm*—Hickman Palermo Truong & Becker LLP (57) ABSTRACT

A method and apparatus for asynchronously storing transaction information related to a transaction is provided. A client process executing on a client may initiate a transaction request with a server. The server processes the transaction, commits the transaction, and writes transaction information associated with the transaction to memory without durably storing the transaction information. Thereafter, the server processing the transaction returns a message to the client that the transaction has been committed. A server process, which performed the transaction, may be reassigned to commit new work. Additional information that may be useful for the client about the result of the transaction may be contained in the message. Next, transaction information stored in memory is durably stored. A log writer may be used to durably store the transaction information to a log file. The client is subsequently notified that the transaction information has been durably stored at a client listening process.

24 Claims, 5 Drawing Sheets

OTHER PUBLICATIONS

Oppliger, Rolf; "Internet Security: Firewalls and Beyond." ACM Press: Communications of the ACM, vol. 40, Issue 5, May 1997; pp. 92-102.*

"Microsoft Computer Dictionary," Fifth Edition, Microsoft Press, 2002; pp. 520-521.*

Tanenbaum, Andrew S., "Computer Networks," Third Edition, Prentice Hall PTR, 1996; pp. 521-545.*

Coulouris et al., "Distributed Systems, Concepts and Design," Second Edition, Addison-Wesley, 1994; pp. 101-112, 353-371, 414-421, 449-461, 492-502.*

* cited by examiner

ASYNCHRONOUSLY STORING TRANSACTION INFORMATION FROM MEMORY TO A PERSISTENT STORAGE

FIELD OF THE INVENTION

The present invention generally relates to the field of transaction processing, and more particularly relates to asynchronously storing transaction information from memory to a persistent storage.

BACKGROUND OF THE INVENTION

A popular pattern of interaction between programming entities involves clients and servers. A client is any program that is capable of making a request to a server and waiting for a response. A server is any program that offers a service that may be requested. Generally, a server accepts a request from the client, the server performs a service in response to the request, and then the server returns a result to the client. The client may be located remotely from the server, although it need not be.

The client may make a request to the server to process a transaction. A transaction is a set of one or more operations that are performed as an atomic unit. For example, within a database system, a transaction may involve numerous database commands that cause numerous changes to a database. While the changes are actually made at different points in time, they are all considered "permanent" (i.e., committed) within the system at the same point in time.

During the course of processing a transaction, a server may store information about the transaction ("transaction information") in a non-persistent storage, e.g., volatile memory. When the server commits a transaction, transaction information is written from the non-persistent storage to persistent storage, e.g., to a log file durably stored on disk. The transaction information durably stored in the log file may be used to produce consistent read blocks for transaction read purposes. Transaction information may also promote read consistency, transaction rollback, and database recovery by inclusion in a rollback segment. A rollback segment is a portion of the database that records the actions of a transaction that should be rolled back under certain circumstances.

Transaction information stored in volatile memory is not durably stored. For example, transaction information stored in volatile memory may be periodically overwritten. Further, transaction information stored in the volatile memory of a server will not survive a crash of the server. As a result, the server may use an entity, such as a log writer, to durably store transaction information stored in volatile memory to a persistent storage when the transaction associated with the transaction information is committed. A log writer is a processing entity that may periodically write transaction information from a non-persistent storage to a persistent storage, such as a log file durably stored on disk. A log writer may durably store transaction information for multiple transactions contemporaneously from volatile memory to a persistent storage.

A client process is a thread of execution running on the client. A client process on the client may initiate a request to process a transaction ("a transaction request") on the server. The server, in servicing the transaction request, may assign a server process to process the transaction request. A server process is a thread of execution running on the server that may be assigned a unit of work. A server may employ a plurality of server processes that may collectively be referred to as a connection pool.

After a particular server process has finished processing a transaction, the transaction may be committed. Once a transaction has been committed, transaction information associated with the committed transactions may be durably stored from memory to a persistent storage. The server process processing the transaction notifies the log writer that transaction information for the particular transaction it is processing should be written from memory to a persistent storage. The server process that has handled the transaction waits (i.e., is "blocked") until receiving notification from the log writer that the log writer has durably stored the transaction information before the server process notifies to the requesting client process that the transaction is completed.

The time between (1) when the server process requesting that transaction information be durably stored from memory to a persistent storage and (2) when the server process receives notification from the log writer the transaction information has been durable stored is referred to as the "log sync latency." Reducing the log sync latency is desirable because the server process cannot perform any useful work while the server process is waiting to receive notification from the log writer that the transaction information has been persistently stored, because the server process is no longer performing work for the current transaction and the server process cannot be reassigned to perform work for another transaction.

It is undesirable to have server processes not performing useful work because the central processing unit ("CPU") of the server is not being utilized to its potential. To increase the utilization of the CPU, additional server processes could be started to process additional work, however, this may also lead to unsatisfactory results, because the cost of context switching between processes increases as the number of processes increases.

Further, the operation of the log writer may result in undesirable operating system scheduling dynamics. When the log writer durable stores transaction information for multiple transactions, multiple server processes are each notified contemporaneously that transaction information for the transaction each server process is currently handling has been durably stored. As a result, multiple server processes become unblocked around the same time. Thus, in a short amount of time, a potentially large amount of server processes switch from being blocked to unblocked, which may negatively impact the quality of service offered by the server to the client.

Accordingly, there is an unaddressed need in the art for durably storing transaction information from memory to a persistent storage at a server without incurring the aforementioned problems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for processing a transaction in a server is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
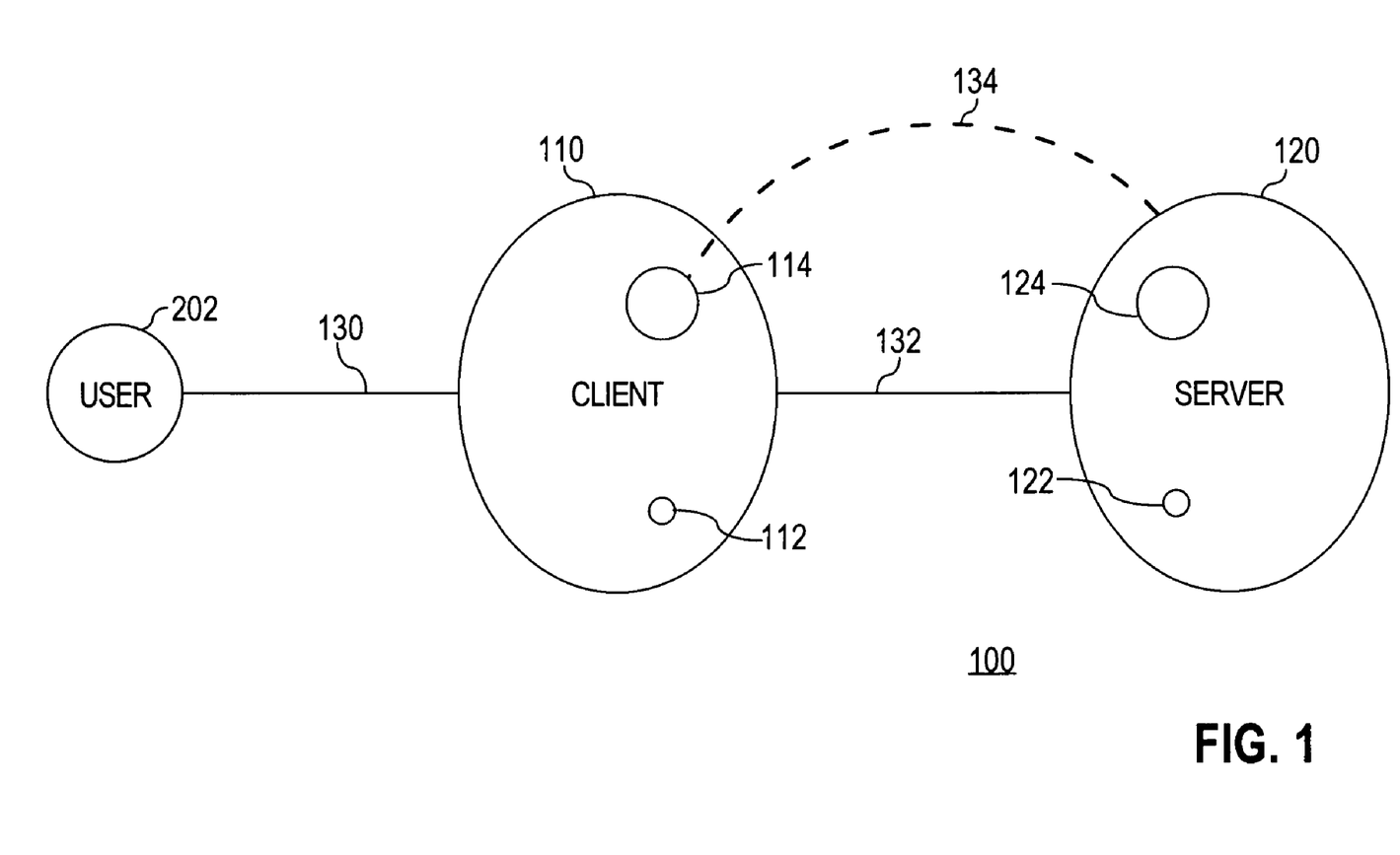
FIG. 1 is a graphical illustration of a client/server transaction processing system according to an embodiment of the invention.

Various aspects of the invention are described hereinafter in the following sections:

I. Architecture Overview
II. Functional Overview
III. Asynchronously Storing Transaction Information
IV. Implementing Mechanisms I. Architecture Overview FIG. 1 is a block diagram illustrating system 100 according to an embodiment of the invention. The system 100 of FIG. 1 includes a user 102, a client 110, a client process 112, a client listening process 114, a server 120, a server process 122, a log writer process, communication links 130, 132, and asynchronous communications link 134. User 102 is any human operator that may interact with or use client 110. While only one user is shown in FIG. 1, any number of users may interact with or use a single client. Client 110 is any program that is capable of making a request to server 120. Client 110 includes client process 112 and a client listening process 114. Client process 112 is a thread of execution running on client 110 that may be assigned a unit of work. Client listening process 114 is a client process that is capable of receiving asynchronous notifications from server 220. While only one client process 112 and one client listening process 114 are shown in FIG. 1, in other embodiments of the invention, client 110 may employ a plurality of client processes and/or a plurality of client listening processes.

Server 120 is any program that offers a service that may be reached over a network. Server 120 may comprise a server process 122 and a log writer process 124. Server process 122 is a thread of execution running on server 120 that may be assigned a unit of work. Log writer process 124 is a processing entity that may periodically write transaction information from a non-persistent storage, such as volatile memory, to a persistent storage, such as a log file durably stored on disk. While only one server process 122 and one log writer process 124 are shown in FIG. 1, in other embodiments of the invention, server 120 may employ a plurality of server processes and/or a plurality of log writer processes.

Communication links 130 and 132 may be implemented by any medium or mechanism that provides for the exchange of data between user 102, client 110, and server 120. Examples of communications links 130 and 132 include, without limitation, a network such as a Local Area Network (LAN), Wide Area Network (WAN), Ethernet or the Internet, or one or more terrestrial, satellite, or wireless links. Log writer process 124 may communicate with client listening process 114 over a variety of communication channels. In an embodiment, log writer process 124 communicates with client listening process 114 over asynchronous communications link 134. Asynchronous communications link 134 may be implemented by any medium or mechanism that provides for the asynchronous exchange of data between log writer process 124 and client listening process 114. For example, in an embodiment, asynchronous communications link 134 is a multi-cast channel.

II. Functional Overview

Figure 2A:
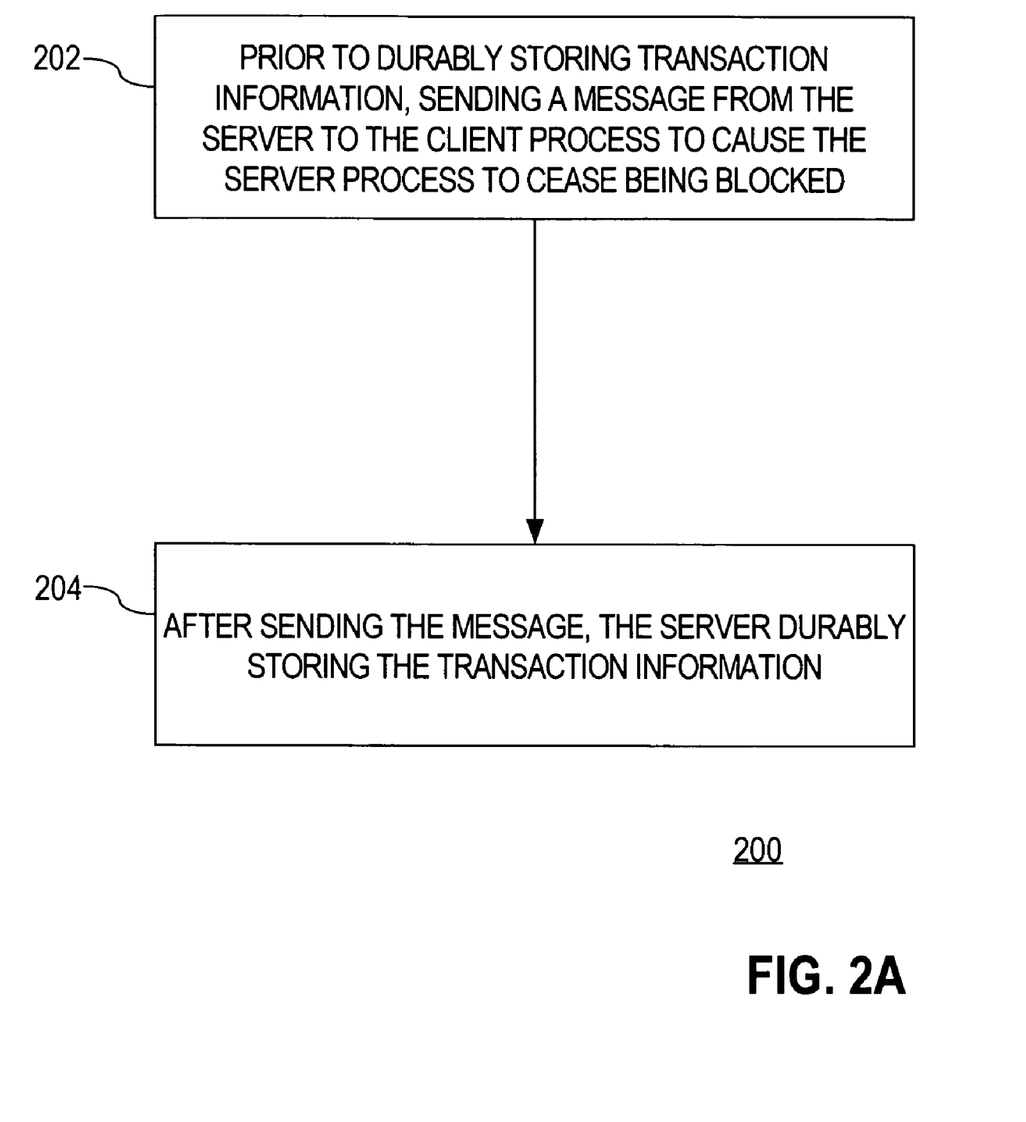
FIG. 2A is a flowchart that depicts the high-level functional steps of asynchronously storing transaction information according to an embodiment of the invention.

FIG. 2A is a flowchart that depicts the high-level functional steps of asynchronously storing transaction information according to an embodiment of the invention. In step 202, prior to durably storing transaction information associated with said transaction being performed by a blocked server process, sending a message from a server to a client to cause the server process to cease being blocked. In step 204, after sending the message, the server durably stores the transaction information.

III. Asynchronously Storing Transaction Information

Figure 2B:
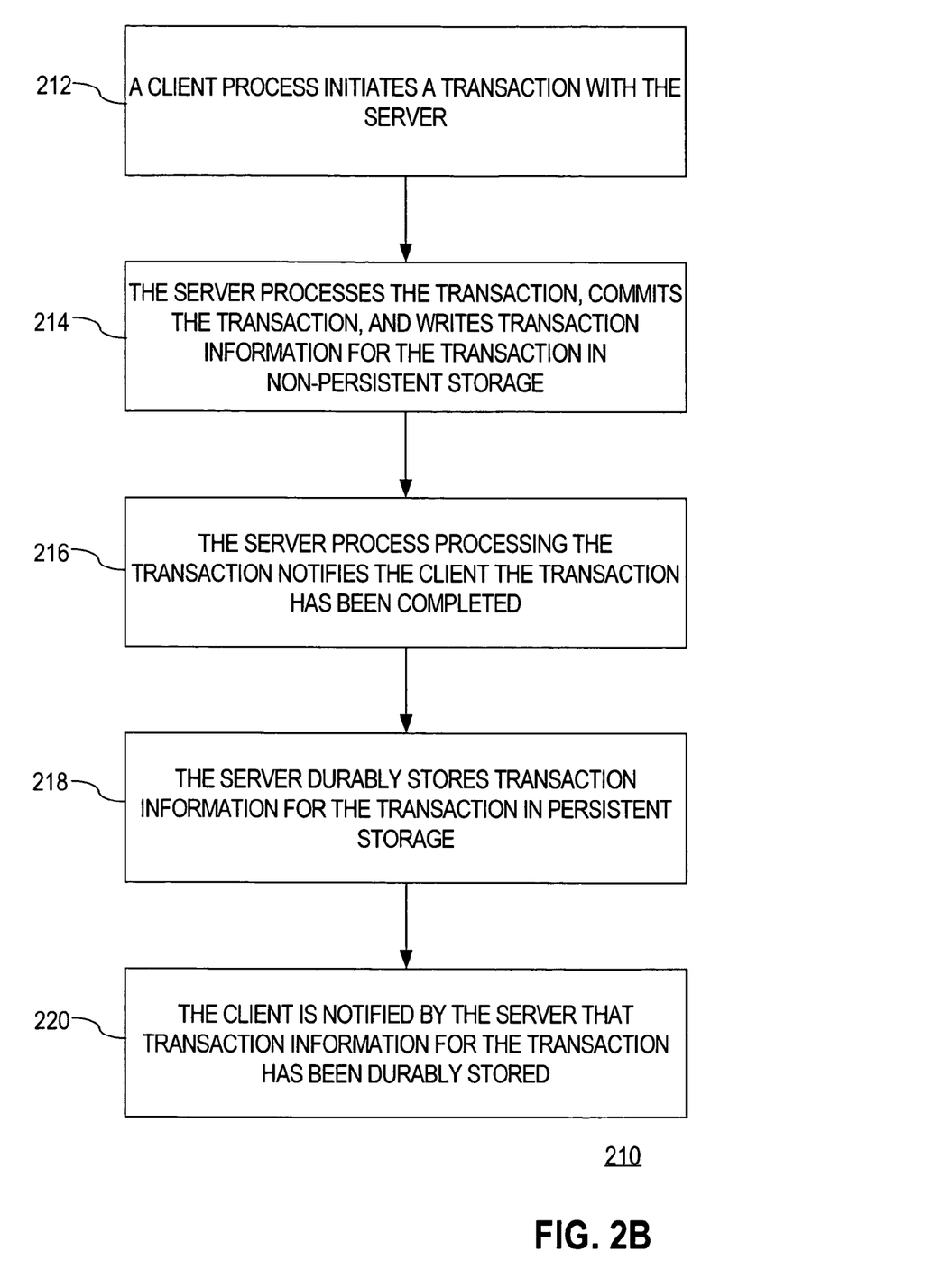
FIG. 2B is a flowchart that depicts the functional steps of asynchronously storing transaction information according to an embodiment of the invention.

The asynchronous storage of transaction information is now described in further detail with reference to flowchart 210 of FIG. 2B. In step 212, a client process initiates a transaction with a server. For example, in an embodiment, client process 112 could initiate a transaction with server 120 over communications link 132.

Figure 3:
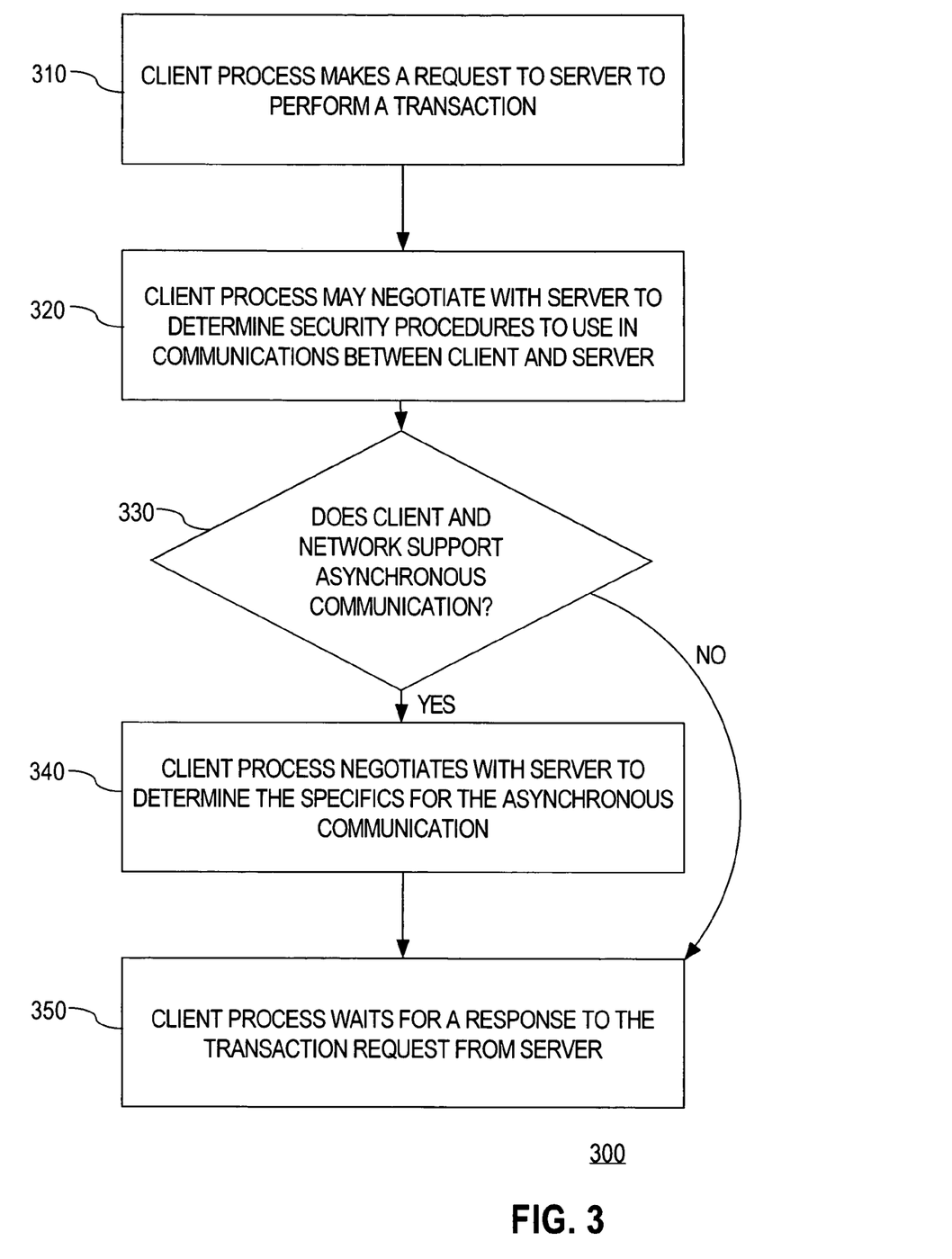
FIG. 3 is a flowchart illustrating the functional steps of a client process initiating a transaction with a server according to an embodiment of the invention.

Step 212 shall be described in further detail according to an embodiment of the invention with reference to the flowchart 300 of FIG. 3. In step 310, client process 112 makes a request to server 120 to perform a transaction. The requesting client process 112 may initiate the transaction on server 120 on behalf of user 102. Client process 112 may call routines in one or more library files resident in client 110 to initiate the transaction. For example, in an embodiment, requesting client process 112 makes a call to a routine in an OCI (Oracle Call Interface) library to establish a connection with the server 120.

Next, in step 320, the requesting client process may negotiate with the server to determine security procedures to use in communications between the client and the server. Step 320 includes determining the security procedures to use in communications between the server and the client in step 220. For example, security procedures or protocols may be identified in step 320 to allow client 110 to accurately determine and/or authenticate the identity of server 120 and/or the log writer process 124 in subsequent communication over communications links 132 and 134. Further, identification information may be sent with any communication from client 110 or server 120 to allow the recipient of the communication to identify its origin. The security procedures identified in step 320 allow client 210 and server 220 to filter communication from external parties.

It should be noted that step 320 is optional; in other words, some embodiments of the invention may perform step 320, while other embodiments of the invention may not perform step 320. In embodiments that do not perform step 320, default security procedures could be used in all communication between client 110 and server 120.

Thereafter, in step 330, the requesting client process 112 determines if client 110 and the network support asynchronous communication over asynchronous communications link 134. If client 110 and the network support communicating over asynchronous communications link 134, then asynchronous communication may be used in step 220. Client 110 may not be able to support communications over asynchronous communications link 134 for a variety of reasons, such as, e.g., a hardware limitation of client 110 or client 110 may not support multi-threaded operations. Additionally, the network over which client 110 and server 120 communicate may not accommodate asynchronous communication, such as communication over a multi-cast channel.

If the determination of step 330 is positive, then processing proceeds to step 340. In step 340, the requesting client process 112 negotiates with server 120 to determine the specifics for the asynchronous communication used in step 220. For example, if a multi-cast channel is used, then in step 340 the channel number (e.g., port number and IP address) of the multi-cast is determined. If the determination of step 330 is negative, or once step 340 is completed, then processing continues to step 350.

In step 350, the requesting client process 112 waits for a response from the server 120 to the transaction request. In other words, client process 112 becomes blocked as it awaits a response from server 120.

It should be noted that the operation described in FIG. 3 may be performed by one or more client processes 112. In other words, for the ease of explanation, the functional steps of client process 112 initiating a transaction with server 120 was described with reference to a single client process 112 performing the steps depicted in FIG. 3. However, those skilled in the relevant art may appreciate that the functional steps illustrated in FIG. 3 may be performed by more than one client process. For example, a first client process could initiate the transaction in step 310, while in parallel a second client process negotiates the security level for communication with server 220 in step 320. Thus, embodiments of the invention provide for a single client process as well as two or more client processes performing the functional steps depicted in FIG. 3.

Returning again to FIG. 2B, in step 214, the server processes the transaction, commits the transaction, and writes transaction information and a system change number to a non-persistent storage. After the transaction is initiated at server 120 in step 212, server 120 may assign a server process 122 to process the transaction. While only one server process 122 is shown in FIG. 1, server 120 may assign server process 122 from a connection pool of server processes.

As server 120 processes the transaction in step 214, server 120 may associate each transaction with a number, hereinafter called a system change number, that enables each transaction to be identified. In an embodiment, the system change number may be a number that is monotonically incremented, e.g., a first transaction is assigned X, the next transaction is assigned X+1, and so on. The system change number may be assigned to the transaction by server 120 at any point, e.g., the system change number may be assigned to the transaction as soon as the transaction is initiated, or at any time before the transaction is completed. In an embodiment, the system change number uniquely identifies a transaction. In another embodiment, the system change number may identify two or more transactions, e.g., the system change number may identify a group of transactions committed contemporaneously.

Once the transaction is committed, the transaction information, along with the system change number for the transaction, is stored in a non-persistent storage. In an embodiment, the server process 122 stores the transaction information and associated system change number in memory in a redo buffer.

Thereafter, in step 216, the server process 122 processing the transaction notifies client 110 that the transaction has been completed. In step 216, server 120 transmits a message to client 110 that the transaction has been committed, although the message does not indicate that transaction information stored in memory for the transaction has been durably stored. The message may contain additional information obtained from processing the transaction that may be utilized by client 110. For example, if client 110 requested a SQL query to be processed by server 120, the message sent in step 216 may contain a set of information that answers the SQL query.

After sending the message, server process 122 may be reassigned to perform new work. After client 110 receives the message, client process 112 is blocked until client process 112 confirms from communications with client listening process 114 that client listening process 114 has received a system change number of equal or greater value than the transaction that client process 112 initiated.

Next, in step 218, server 120 durably stores transaction information and the associated system change number for the transaction. In an embodiment of the invention, log writer process 224 may perform this function by periodically writing transaction information and system change numbers from memory to a persistent storage, such as a log file stored on disk. Log writer process 224 may durably store transaction information in memory for multiple transactions. In an embodiment, after transaction information has been durably stored, it is removed from memory.

Subsequently, in step 220, client 210 is notified by server 220 that transaction information for the transaction has been durably stored. Client 210 may be notified through a variety of communication channels. In an embodiment, if the determination in step 330 yielded a positive answer, asynchronous communications link 134 may be used in step 220 to transmit notification to client 110 that transaction information has been durably stored for the transaction. In an embodiment, server 120 may transmit notification over asynchronous communications link 134 using multi-cast communication to client listening process 214. Communication via multi-cast may be advantageous because the cost of establishing the specifics for performing multi-casting (such as those established in step 340) may be amortized across the client process 212 initiating a transaction with server 220 (as performed in step 212). If the determination of step 330 is negative, then client 210 is notified by server 220 that transaction information for the transaction has been durably stored through the synchronous response for the client call over the communications link 132.

The notification transmitted by the server 120 in step 220 may contain checkpoint information, which is a set of information indicating which transactions have had transaction information associated with them durably stored. In an embodiment, the notification contains checkpoint information that indicates a specific set of transaction information that has been durably stored. For example, the checkpoint information may contain one or more system change numbers corresponding to specific transactions that have recently had transaction information associated with them durably stored by the server.

In another embodiment, the checkpoint information may contain a single system change number. In that embodiment, any transaction with a system change number of equal or less value than the system change number contained within the notification has been durably stored by server 120. This is advantageous, because only a single system change number would need to be stored by client listening process 114 to allow client 110 to determine what transactions have had transaction information durably stored. For example, the system change number could be monotonically increased, thus ensuring that any transaction associated with a system change number that is lower than a system change number maintained by the client listening process 114 has been durably stored. In an embodiment, the client listening process 114 may enable multiple client processes to access the notification; thus, any one of a number of client processes may determine what set of transactions the server 120 has durably stored.

After the message in step 216 is received, if client listening process 114 does not receive notification from server 120 that the transaction information has been durably stored after a particular period of time, then client listening process 114 may initiate recovery procedures. The period of time each client listening process 114 waits before initiating recovery procedures may be configured. The waiting client process 112 may initiate another communication with server 120 to determine whether transaction information for the transaction the waiting client process 112 is associated with has been durably stored. If server 120 has durably stored transaction information, then client listening process 114 may be notified by server 120 that the transaction information has been durably stored. If server 120 has not durably stored transaction information, then the server may initiate a process to determine why the transaction information was not stored. In an embodiment, if server 120 receives too many messages from client 110 that the client has not received notification from server 110 that transaction information has been durably stored for a transaction, then server 120 may operate in a mode wherein a server process 122 processing a transaction does not notify the client 110 that the transaction has been completed in step 216 until after transaction information has been durably stored in step 218.

Embodiments of the invention advantageously allow the server process 122 processing the transaction to notify client 110 that the transaction has been completed before the transaction information associated with the transaction has been durably stored. This aspect of the invention both reduces the wait at the server 120, because server process 122 involved in processing a transaction may become unblocked prior to the transaction information associated with the transaction becoming durably stored.

Embodiments of the invention also advantageously provide for enhanced scheduling dynamics because each server process may notify clients that a transaction it was processing has completed prior to each server process receiving notification from the log writer process that the transaction information associated with the transaction the particular server process was servicing has been durably stored. Thus, the problems of unblocking a plurality of server processes contemporaneously by transmitting notification to multiple server processes that transaction information for a transaction associated with each server process has been durably stored is avoided. This aspect of the invention further increases the effectiveness of the CPU because the CPU spends more time performing useful work.

IV. Implementing Mechanisms

Figure 4:
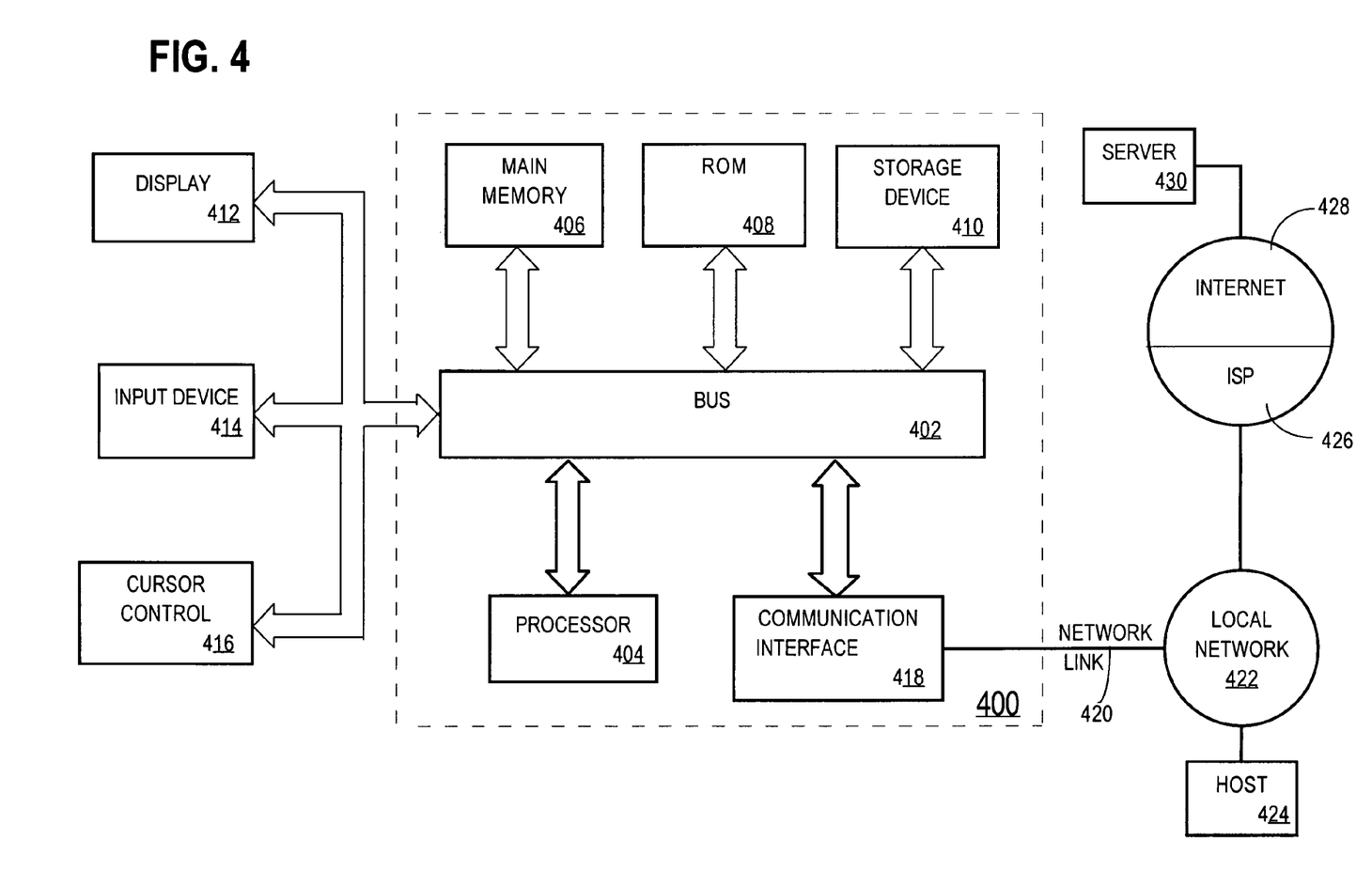
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A machine-implemented method for processing a transaction by a server, comprising the steps of:
    receiving, from a client, at the server, a request to process the transaction;
    processing the transaction using a first server process;
    wherein a second server process that is different from said first server process is responsible for durably storing transaction information associated with the transaction;
    wherein the first server process blocks after completing the transaction to wait for the second server process to durably store the transaction information associated with the transaction;
    prior to the second server process durably storing transaction information associated with the transaction, (a) sending, from the server to the client, a first message that indicates that the transaction has committed and (b) causing said first server process to cease being blocked;
    after sending the first message, the second server process durably storing said transaction information; and
    after said transaction information is durably stored, sending, from the server to the client, a second message that indicates that said transaction information is durably stored;
    wherein the steps are performed by one or more computing devices.

2. The method of claim 1, wherein the step of sending the second message is performed using a multi-cast message.

3. A computer-readable storage medium storing instructions which, when executed by one or more processors, cause the one or more processors to perform the steps recited in claim 2.

4. The method of claim 1, further comprising:
    the client recording checkpoint information after the client receives the second message at said client, wherein said checkpoint information indicates whether said transaction information has been durably stored in a log.

5. The method of claim 4, wherein said checkpoint information includes a system change number, and a client process of said client consults said system change number to determine if said transaction information associated with said transaction has been durably stored.

6. A computer-readable storage medium storing instructions which, when executed by one or more processors, cause the one or more processors to perform the steps recited in claim 5.

7. The method of claim 4, wherein said checkpoint information is stored such that said checkpoint information may be accessed by a plurality of client processes at said client.

8. A computer-readable storage medium storing instructions which, when executed by one or more processors, cause the one or more processors to perform the steps recited in claim 7.

9. A computer-readable storage medium storing instructions which, when executed by one or more processors, cause the one or more processors to perform the steps recited in claim 4.

10. The method of claim 1, further comprising:
    after sending the first message and before sending the second message, receiving, at said server, from said client, notification that said client has not received notification that said transaction information is durably stored.

11. A computer-readable storage medium storing instructions which, when executed by one or more processors, cause the one or more processors to perform the steps recited in claim 10.

12. The method of claim 1, further comprising:
    contemporaneous with the step of sending the first message, reassigning said first server process at said server to a new transaction, wherein said first server process was previously assigned to said transaction.

13. A computer-readable storage medium storing instructions which, when executed by one or more processors, cause the one or more processors to perform the steps recited in claim 12.

14. The method of claim 1, further comprising:
    prior to the step of durably storing transaction information, the server determining whether said client is capable of handling multi-cast messages.

15. A computer-readable storage medium storing instructions which, when executed by one or more processors, cause the one or more processors to perform the steps recited in claim 14.

16. The method of claim 1, wherein said first message is sent from said server to said client in accordance with a set of security procedures established when said client initiates said transaction at said server.

17. A computer-readable storage medium storing instructions which, when executed by one or more processors, cause the one or more processors to perform the steps recited in claim 16.

18. The method of claim 1, further comprising:
prior to the step of sending the first message, the server determining a set of security procedures to use in sending the first message to said client.

19. A computer-readable storage medium storing instructions which, when executed by one or more processors, cause the one or more processors to perform the steps recited in claim 18.

20. The method of claim 1, wherein said first message includes information about a result of processing said transaction.

21. A computer-readable storage medium storing instructions which, when executed by one or more processors, cause the one or more processors to perform the steps recited in claim 20.

22. The method of claim 1, further comprising:
sending, from the client to the server, a second request to process a second transaction;
before the server durably stores second transaction information associated with the second transaction, receiving, at the client, from the server, a third message that indicates that the second transaction has committed;
the client tracking how much time elapses from receipt of the third message;
in response to the client determining that a certain period of time has elapsed after the client has received the third message without the client receiving notification that said second transaction information is durably stored, the client initiating a recovery mechanism to confirm that the second transaction information is durably stored.

23. A computer-readable storage medium storing instructions which, when executed by one or more processors, cause the one or more processors to perform the steps recited in claim 22.

24. A computer-readable storage medium storing instructions which, when executed by one or more processors, cause the one or more processors to perform the steps recited in claim 1.

* * * * *

UNITED STATES PATENT AND TRADEMARK OFFICE
CERTIFICATE OF CORRECTION

PATENT NO.        : 7,624,112 B2                                      Page 1 of 1
APPLICATION NO.   : 10/407998
DATED             : November 24, 2009
INVENTOR(S)       : Amit Ganesh et al.

It is certified that error appears in the above-identified patent and that said Letters Patent is hereby corrected as shown below:

Title page, item (*) Notice:    should read as follows:  Subject to any disclaimer, the term of this patent is extended or adjusted under 35 U.S.C. 154(b) by 1094 days.

On the title page, item (56), in column 2, under "Other Publications", line 5, delete "Ouseterhout;" and insert -- Ousterhout; --, therefor.

Signed and Sealed this

Fourteenth Day of September, 2010

David J. Kappos
*Director of the United States Patent and Trademark Office*